United States Patent [19]
Flotho et al.

[11] Patent Number: 6,130,817
[45] Date of Patent: Oct. 10, 2000

[54] HOLDING SYSTEM FOR ELECTRONIC MODULES

[75] Inventors: Helmut Flotho, Fürstenberg; Franz-Josef Knoop, Büren, both of Germany

[73] Assignee: Siemens Nixdorf Informationssysteme AG, Paderborn, Germany

[21] Appl. No.: 09/380,690

[22] PCT Filed: Jan. 23, 1998

[86] PCT No.: PCT/DE98/00212

§ 371 Date: Sep. 3, 1999

§ 102(e) Date: Sep. 3, 1999

[87] PCT Pub. No.: WO98/39704

PCT Pub. Date: Sep. 11, 1998

[30] Foreign Application Priority Data

Mar. 4, 1997 [DE] Germany ............... 197 08 775

[51] Int. Cl.[7] ............... H05K 5/00; H05K 7/00; H05K 5/02

[52] U.S. Cl. ............... 361/685; 361/686; 361/683; 360/98.01; 312/332.1; 312/223.2; 248/685; 248/200

[58] Field of Search ............... 361/685, 686, 361/684, 724, 725, 728, 747, 683; 312/332.1, 333, 223.2, 223.1, 251.1; 360/98.01; 248/685, 693, 200, 205.1, 300, 309.1

[56] References Cited

U.S. PATENT DOCUMENTS

| | | | |
|---|---|---|---|
| 4,937,806 | 6/1990 | Babson et al. | 369/75.1 |
| 4,941,841 | 7/1990 | Darden et al. | 439/377 |
| 5,004,207 | 4/1991 | Ishikawa et al. | |
| 5,211,459 | 5/1993 | Wu | 312/223.2 |
| 5,216,582 | 6/1993 | Russell et al. | |
| 5,333,097 | 7/1994 | Christensen et al. | 361/685 |
| 5,463,527 | 10/1995 | Hager et al. | 361/685 |
| 5,491,608 | 2/1996 | Koyanagi et al. | 361/685 |
| 5,563,767 | 10/1996 | Chen | 361/685 |
| 5,596,484 | 1/1997 | Suzuki | |
| 5,694,290 | 12/1997 | Chang | 361/685 |
| 5,767,445 | 6/1998 | Wu | 174/52.1 |
| 5,828,547 | 10/1998 | Francovich et al. | 361/685 |
| 5,921,644 | 7/1999 | Brunel et al. | 312/223.2 |
| 6,008,984 | 12/1999 | Cunningham et al. | 361/685 |
| 6,040,980 | 3/2000 | Johnson | 361/685 |

FOREIGN PATENT DOCUMENTS

| | | | |
|---|---|---|---|
| 89 11 954 | 1/1990 | Germany. | |
| 295 05 578 U | 7/1995 | Germany. | |
| 11-3405 | 1/1999 | Japan | G06K 17/00 |
| 682 965 | 12/1993 | Switzerland. | |
| 2 190 793 | 11/1987 | United Kingdom. | |

OTHER PUBLICATIONS

"3–Degrees of Freedom Flex Cable design to Facilitate Sub–Assembly Shock Isolation; Including a Direct Access Storage Device Unit", IBM Technical Disclosure Bulletin, Dec. 1993, vol. 36, No. 12, pp. 595–596.

"Frictional–Elastomeric Shockmount System for Mechanical Isolation of a Fragile Device from Sources of Vibration and Shock", IBM Technical Disclosure Bulletin, Feb. 1991, vol. 33, No. 9, pp. 53–57.

*Primary Examiner*—Leo P. Picard
*Assistant Examiner*—Anatoly Vortman
*Attorney, Agent, or Firm*—Hill & Simpson

[57] ABSTRACT

A holding system for electronic modules, particularly for magnetic disk drives the holding system a withdrawable frame which can be inserted into a drive bay of an electronic data processing device, particularly a PC, and whose length corresponds to the depth of the drive bay, and further having a U-shaped bracket in whose U limbs first holes are provided for the passage of first fastening elements for fastening the bracket on lateral surfaces, directed parallel to the inserting direction, of the module, and second holes are provided for the passage of second fastening elements for fastening the bracket to the withdrawable frame. The fastening elements can be surrounded by damping elements consisting of an elastic material.

12 Claims, 4 Drawing Sheets

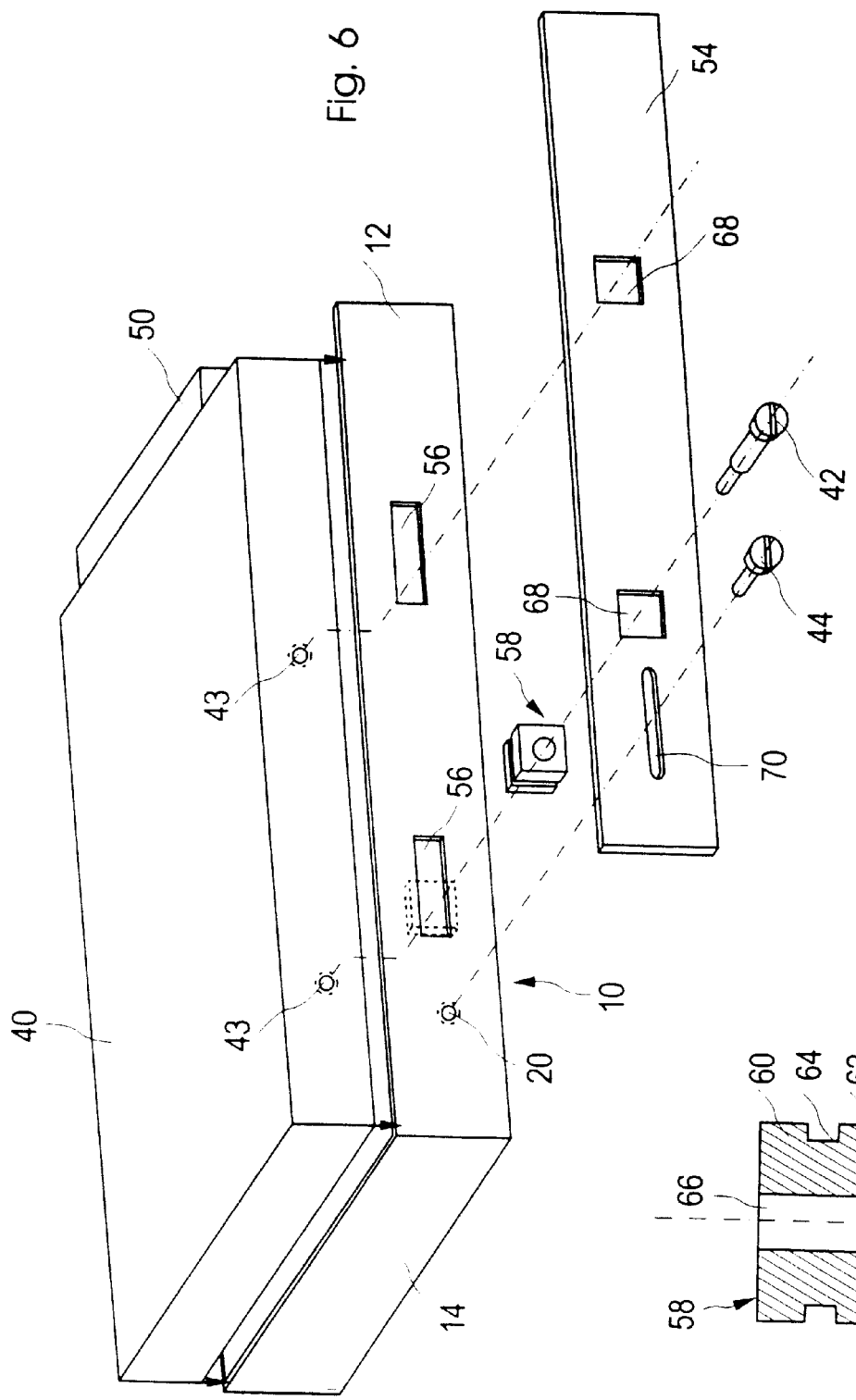

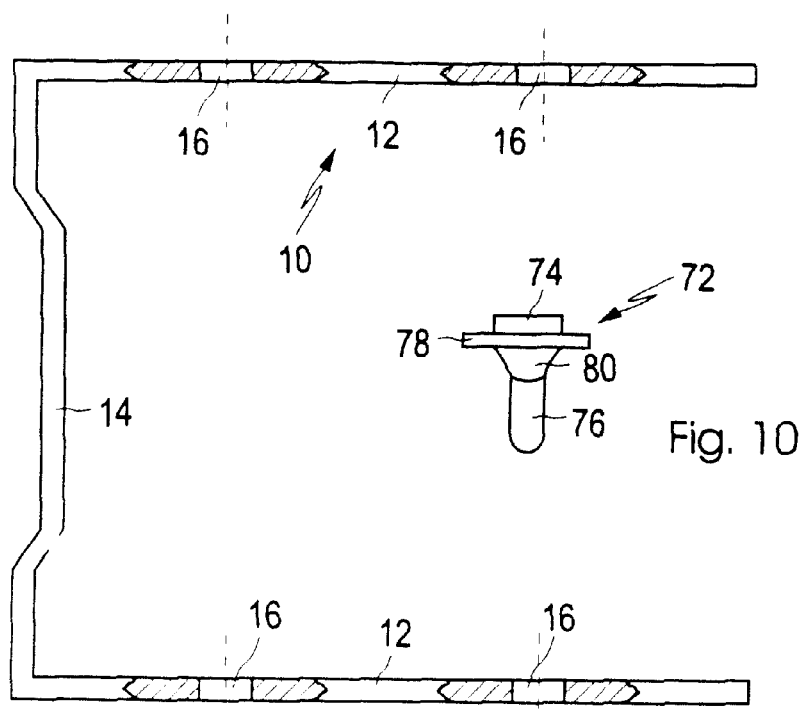
Fig. 10
Fig. 8
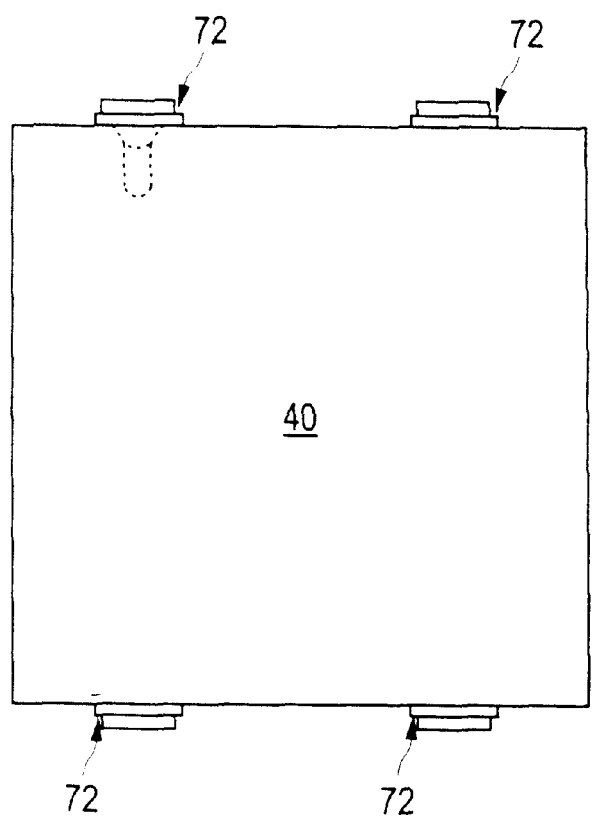
Fig. 9

HOLDING SYSTEM FOR ELECTRONIC MODULES

BACKGROUND OF THE INVENTION

1. Field of the Invention

The present invention relates to a holding system for electronic modules, particularly for magnetic disk drives, the holding system having a withdrawable frame, which can be inserted into a drive bay of an electronic data processing device, such as a PC, or a peripheral unit, a and whose length corresponds to the depth of the drive bay.

2. Description of the Prior Art

Although electronic modules intended for insertion into a drive bay of a PC, for example, are standardized in their external dimensions to such an extent that they fit into a cross section of the drive bay, the length of the modules measured in the inserting direction can vary. There are, for example, drives which bear a plug with which they can be plugged directly onto the rear wall of the electronic data processing device, whereas other drives, provided for use in PCs, in particular with disks of the same diameter, bear plugs which are incompatible with the plugs on the rear wall of the device, and can therefore be connected indirectly to the electronic system of the device via a flexible conductor arrangement and a plug connected to the latter. As a result, the drives must be fastened at different sites in the withdrawable frame.

A mounting kit for mounting a floppy-disk drive in a holding bay intended for a relatively large electronic device has already been described in U.S. Pat. No. 5,596,484. The mounting kit has two mounting rails with a U-shaped cross-sectional profile. There rails are screwed tight to a U limb on both side walls of the floppy-disk drive. Provided for this purpose in the U limb adjacent to the side wall are fastening holes, through which fastening screws are screwed into the housing of the floppy-disk drive. Provided in the other U limb are enlarged cutouts, which permit the passage of the screw head. The U limb is also provided with threaded holes into which additional screws for fastening the floppy-disk drive in the holding bay are screwed. The mounting rails project rearward beyond the floppy-disk drive. Inserted in the projecting region between the mutually opposite U limbs of the two mounting rails is a printed circuit board which bears on the side facing the floppy-disk drive, a plug which is to be connected to the latter, and on the side parallel thereto a connecting plug to the holding bay.

SUMMARY OF THE INVENTION

It is an object of the invention to provide a holding system for electronic modules which facilitates simple mounting of different modules on a withdrawable frame and easy setting of an operating dimension, which is given by the distance between an insert plug, which is intended for connection to a rear wall of a data processing device, and an unlocking lever arranged on an opposite side of the withdrawable frame.

This object is achieved in accordance with the invention by a U-shaped bracket in whose U limbs are first holes for the passage of first fastening elements for fastening the bracket to lateral surfaces of the module, which are directed parallel to the inserting direction of the module, and second holes for the passage of second fastening elements for fastening the bracket to the withdrawable frame.

By comparison with the withdrawable frame, the bracket is a part which can be produced cost-effectively and easily. It is possible either to provide a number of such brackets adapted to the respective modules, or it is preferably possible to use a bracket having first fastening holes which correspond to the respective modules to be mounted. It is therefore unnecessary for the withdrawable frame itself to be adapted to the respective modules.

In a particularly preferred embodiment, which offers at least two different mounting positions for modules, the first holes are arranged asymmetrically with respect to the longitudinal bisector of the U limbs. If the bracket is mounted in one case such that its U cross-web points toward the rear wall of the device, and in another case is connected in the opposite position to the withdrawable frame, the first fastening holes have different distances in the two positions of the bracket from the end of the withdrawable frame facing the rear wall of the device. This offers the possibility of mounting electronic modules of different length or at different distances from the end of the withdrawable frame facing the rear wall of the device.

The first holes are preferably smooth bores, whereas the second holes may have an internal thread. This offers the possibility, on the one hand, of screwing the bracket on the module and, on the other hand, of conveniently screwing the withdrawable frame on the bracket connected to the module. In this case, the cutouts in the withdrawable frame which are assigned to the second holes can be formed as elongated holes whose longitudinal axis runs parallel to the inserting direction. This offers an additional possibility of adjusting the module in the inserting direction relative to the withdrawable frame.

It is possible to provide, on the U cross-web of the bracket, fastening holes for fastening a plug which is intended for electrical connection to the rear wall of the device. There is thus no need for a dedicated holder or fastening lugs for the plug when the latter is not fastened on the module itself but is connected to the module via flexible conductors.

The withdrawable frame can, for example, be formed by a cuboid housing of which one housing wall, directed parallel to the inserting direction, projects beyond the adjacent housing walls at its edges parallel to the inserting direction in such a way that the housing can be inserted with the edges into the guide rails of the drive bay. The housing not only serves to protect the module mechanically, but can also be constructed as an electronic shield.

Specific modules are sensitive to shocks or vibration. This holds, in particular, for disk drives. It has been shown in the case of the use of hard disk drives of the newer generation that the dynamic properties of the withdrawable frame and of the device chassis exert a strong influence on the operational reliability of the drive. Magnetic disk drives of the newer generation are much more sensitive to vibrations, since the increase in the storage capacity of such disk drives is always achieved by increasing the track density.

For the purpose of eliminating this problem and of increasing the operational reliability with regard to vibrations, it is therefore proposed according to the invention that the first and/or the second fastening elements surrounded by damping elements consisting of an elastic material, at least in their region penetrating the U limbs and/or a frame element. The damping elements prevent vibrations at the fastening sites between the withdrawable frame and the drives from being transmitted directly. The damping elements have at least one flange intended for bearing against a U limb surface and a holding section engaging in the relevant hole. In an embodiment of the damping elements which can be mounted easily and reliably, the damping elements comprise two mutually parallel flanges interconnected by the holding section. The damping elements can be mounted like a cable sleeve which is used to lead cables through sheet-metal walls, by compressing one of the flanges and pushing it through the relevant hole. The flange springs open again on the other side of the U limb, with the result that the damping element is seated firmly in the relevant hole. It goes without saying that the diameter of the hole must be adapted to the thickness of the holding section. Mounting can also be further facilitated by having that the damping elements already permanently connected to the fastening elements.

DESCRIPTION OF THE DRAWINGS

FIG. 6 is a diagrammatic perspective exploded view for the purpose of explaining the mounting of a disk drive on a mounting bracket with the use of damping elements, constructed in accordance with the invention.

FIG. 7 is a cross-sectioned view of a damping element used in the arrangement in accordance with FIG. 6.

FIG. 8 is a partially sectioned top view of a bracket in accordance with a further embodiment of the invention.

FIG. 9 is a diagrammatic top view of a disk drive which is provided with fastening elements belonging to the bracket in accordance with FIG. 8.

FIG. 10 is a diagrammatic side view, on an enlarged scale, of a fastening element used in FIG. 9.

DESCRIPTION OF THE PRESENTLY PREFERRED EMBODIMENT

Figure 1:
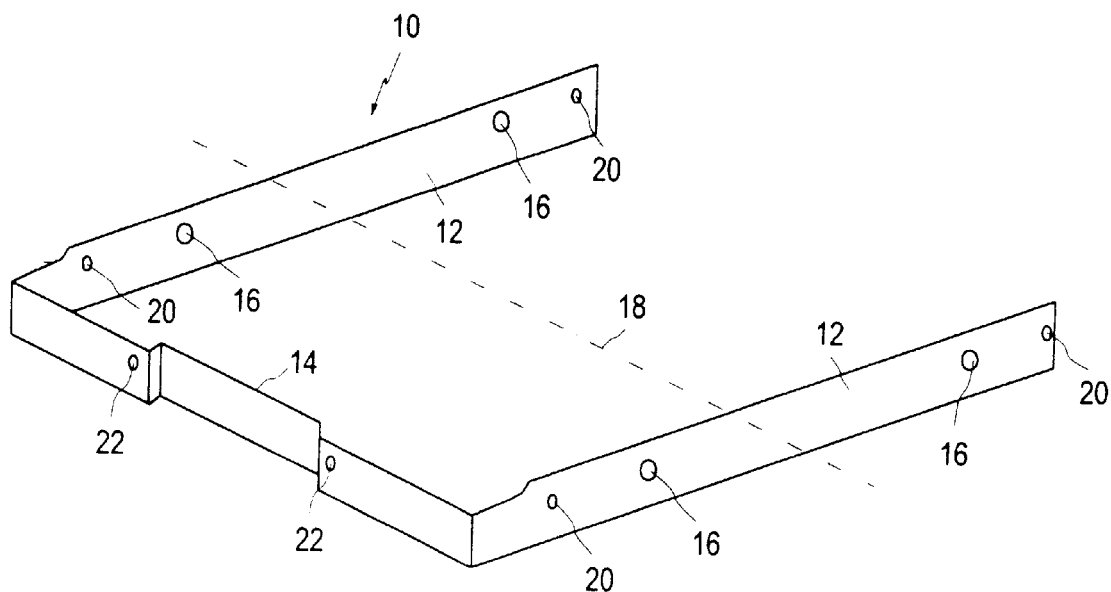
FIG. 1 is a diagrammatic perspective view of a bracket constructed in accordance with the invention.

FIG. 1 shows a U-shaped mounting bracket which is denoted in general by 10 and is intended for mounting an electronic module, in particularly a disk drive, in a withdrawable frame. The mounting bracket 10 comprises a sheet-metal strip and has two mutually parallel U limbs 12 which are interconnected via a U cross-web 14. Provided in the U limbs 12 are first fastening holes 16 which serve for plugging through fastening elements, such as screws by means of which the mounting bracket 10 can be screwed on a disk drive. As may be seen in FIG. 1, the fastening holes 16 are arranged asymmetrically with respect to the longitudinal central axis of the U limbs 12, which is shown by a dashed and dotted line 18.

Also provided in the U limbs 12 are second fastening holes 20 which serve to fasten the mounting bracket 10 to the withdrawable frame. The second fastening holes 20 can be provided with a thread.

The U cross-web 14 likewise has two threaded bores 22, with which it is possible to fasten to the U cross-web 14. a plug 50 (FIG. 2) which permits the module mounted in the mounting bracket 10 to be plugged to a rear wall of a data processing device, as will be explained further below.

Figure 2:
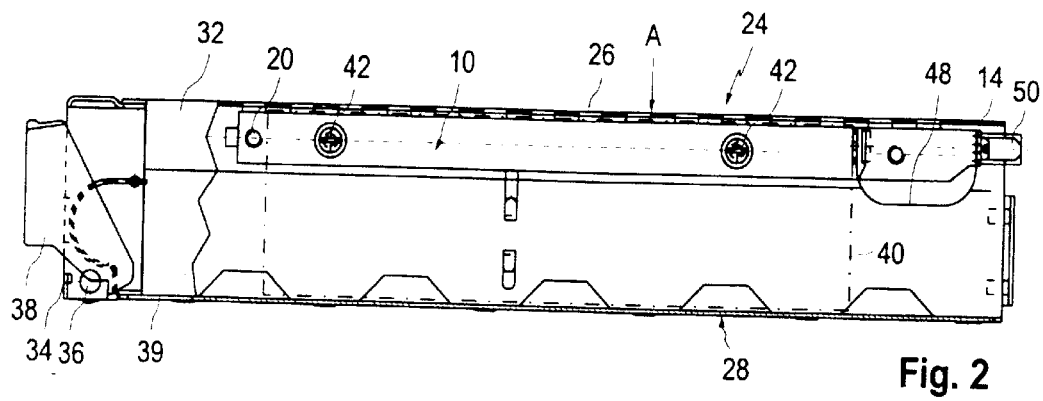
FIG. 2 is a side view of a housing-shaped whithdrawable frame with a mounted magnetic disk drive, a part of the withdrawable frame side wall having been removed, constructed in accordance with the invention.
Figure 3:
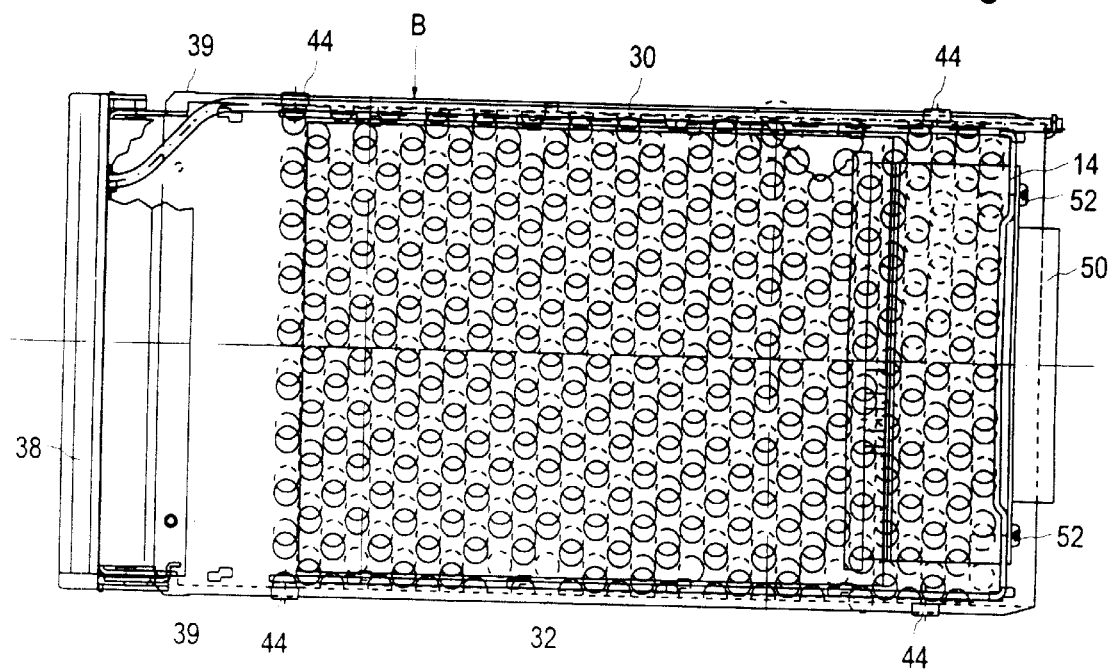
FIG. 3 is a plan view of the withdrawable frame represented in FIG. 2 taken in the direction of arrow A in FIG. 2, parts of the withdrawable frame top surface having been removed, constructed in accordance with the invention.
Figure 4:
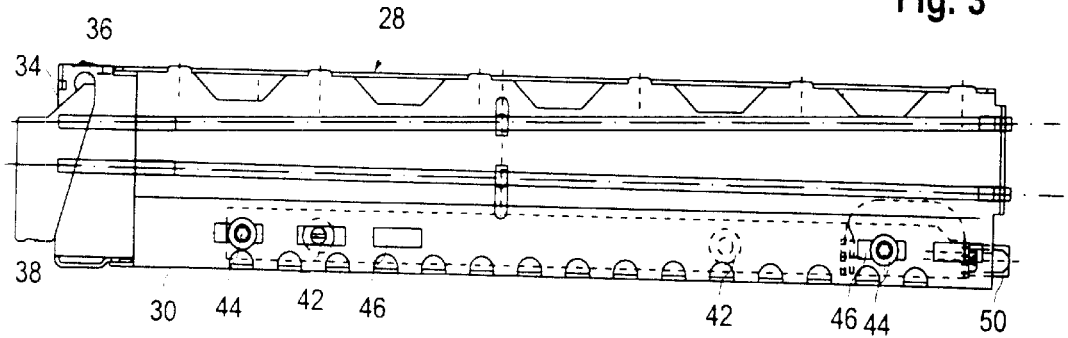
FIG. 4 is a side view of the withdrawable frame represented in FIGS. 2 and 3 taken in the direction of arrow B in FIG. 3, constructed in accordance with the invention.

FIGS. 2 to 4 show the use of the mounting bracket, represented in FIG. 1, in a withdrawable frame in accordance with a first embodiment of the invention. The withdrawable frame represented in general by 24 in FIGS. 2 to 4 comprises a cuboid housing with a top surface 26, a bottom surface 28, side walls 30 and 32, and a front wall 34. The rear wall is open. The top surface 26 and the bottom surface 28 are formed by perforated sheets in order to facilitate the ventilation of the enclosed drive 40. An unlocking lever 38 which can swivel about an axis 36 and facilitates the extraction of the withdrawable frame 24 from a device in a known way is pivoted at the front side 34 of the withdrawable frame 24. At its longitudinal edges 39, the bottom surface 28 projects beyond the adjacent side walls 30, 32, with the result that the withdrawable frame 24 can be inserted with these edges 39 into the guide rails of a drive bay of a module (not represented).

A drive 40 is mounted in the withdrawable frame 24 with the aid of the mounting bracket 10 represented in FIG. 1. The mounting bracket 10 is screwed on the drive 40 in this case with the aid of screws 42 which penetrate the first fastening holes 16 (FIG. 1). The mounting bracket 10 is fastened on the side walls 30 and 32 of the withdrawable frame 24 with the aid of screws 44 which penetrate elongated holes 46 in the side walls 30 and 32 (FIG. 4) and engage in the second fastening holes 20 (FIG. 1) of the mounting bracket 10. As may be seen from FIGS. 2 to 4, the mounted drive 40 cannot be plugged directly onto the rear wall of the device, but is connected to a plug 50 via a flexible conductor arrangement 48. The mounting bracket 10 is arranged such that its U cross-web 14 is situated near the rear side of the withdrawable frame 24 and can bear the plug 50 which is fastened to the U cross-web 14 via screws 52 (FIG. 3). The longitudinal holes 46 in the side walls 30, 32 of the withdrawable frame 24 allow positioning the mounting bracket 10 together with the drive 40 within the withdrawable frame 24 such that the distance between the plug 50 and the unlocking lever 38, the so-called operating dimension, is adapted exactly to the length or depth of the drive bay.

Figure 5:
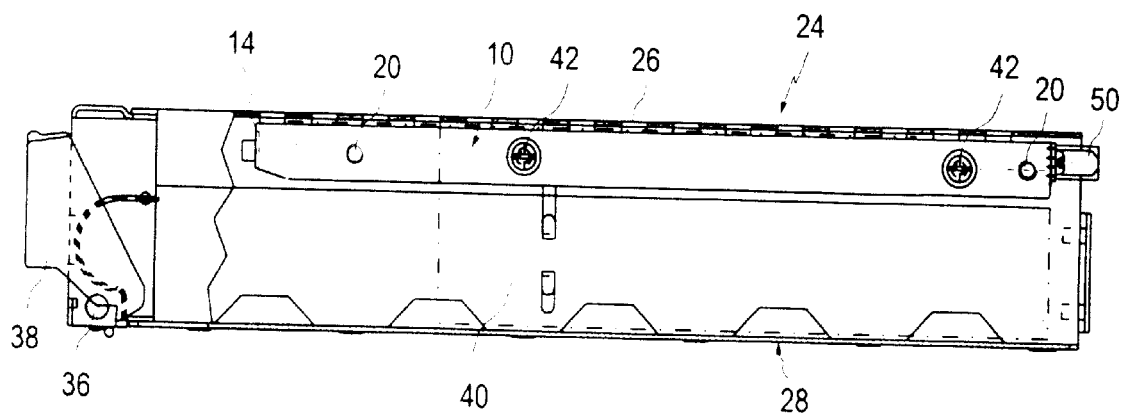
FIG. 5 is a side view, corresponding to FIG. 2, of a withdrawable frame with a different disk drive and the bracket in a mounting position rotated by 180 degrees, constructed in accordance with the invention.

FIG. 5 shows the use of the mounting bracket 10 represented in FIG. 1 for mounting a drive 40 which is directly connected to its plug 50, that is to say, which can be plugged directly onto the back wall of the device. In this case, the mounting bracket 10 is swung by 180° about the longitudinal central axis 18 (FIG. 1) of the U limbs 12, with the result that the U cross-web 14 points toward the unlocking lever 38. The drive 40 therefore moves close to the rear side of the withdrawable frame 24, with the result that the operating dimension is observed again, and the plug 50 can be plugged directly onto the rear wall of the device. The mounting bracket 10 and the withdrawable frame 24 are, however, completely identical to the parts used in the case of the arrangement in accordance with FIGS. 2 to 4.

As already explained above, there is the risk that with drives 40 the operational reliability can be impaired by vibrations. A considerable role is played 40 to this case by the fastening of the drives in the withdrawable frame 24. According to the invention, damping elements 58 (FIG. 6) are provided in the region of the fastening points in order to be able to separate the drives 40 more effectively from the withdrawable frame 24 with regard to vibrations. This is to be explained with the aid of the diagrammatic representation of FIG. 6. Identical parts are provided again with identical reference numerals.

The withdrawable frame 24 (FIG. 2), on which the mounting bracket 10 can be fastened, is only indicated by a rail 54, in this case. The first fastening holes 16 (FIG. 1) in the U limbs 12 of the mounting bracket 10 are formed in the present case by rectangular cutouts 56. A damping element 58 is inserted in each case into said cutouts 56. The damping element 58 comprises two flanges 60, 62 (FIG. 7) whose external dimension is greater than the length of the smaller side of the rectangle of the cutouts 56. The flanges 60 and 62 (FIG. 7) are interconnected by a holding section 64 (FIG. 7) whose external dimension corresponds approximately to the clearance dimension of the smaller side of the rectangle of the cutouts 56. The entire damping element 58 has a central bore 66 (FIG. 7) through which a fastening screw 42, designed as a necked screw, can be plugged in order to connect the mounting frame 10 to the drive 40, and screwed into a threaded hole 43. The neck of the screw 42 is thus completely surrounded by the elastic material of the damping element 58 without compressing the latter. The damping element 58 represented in FIGS. 6 and 7 can be mounted in the manner of a cable sleeve which serves to guide a cable through a wall opening, by compressing one of the flanges 60, 62 (FIG. 7) and plugging it through the cutout 56. After being plugged through, the compressed flange 60 or 62 springs open again, with the result that the edges of the cutout 56 are mounted between the two flanges 60, 62 of the damping element 58. The damping element 58 can be displaced in the rectangular cutouts 56 for the purpose of correct positioning.

The strip 54 has a rectangular cutout 68 into which the damping element 58 fits. Furthermore, formed in the strip 54 are elongated holes 70 which are assigned to the holes 20 in the mounting bracket 10 and through which the fastening screws 44 can be plugged for the purpose of connecting the strip 54 to the U limb 12. Thus, the drive 40 and the holding system which holds it can be decoupled with regard to the dynamic properties by the damping elements 58.

In another embodiment a vibration-damped connection between the mounting bracket 10 and the drive 40 which is particularly simple with regard to mounting is represented in FIGS. 8 to 10. The connection is made via fastening elements 72, of which one is represented on an enlarged scale in FIG. 10. Each fastening element 72 comprises a bolt with a head part 74 made from an elastic material into which a rigid shank part 76 is cast. An elastic damping washer 78 is integrally formed on the head part 74. The elastic material merges on its side remote from the head part 74 into a conical sleeve 80 which surrounds a part of the shank 76. The shank part 76 of the fastening element 72 is pressed into the threaded bore 43 (FIG. 6) in the drive 40, with the result that the damping washer 78 bears against the wall of the drive 40, as is represented in FIG. 9. The drive 40, which is provided with the fastening elements 72, is then placed between the U limbs 12 of the mounting bracket 10, the head parts 74 of the fastening elements 72 latching into the first holes 16, adapted to the diameter of the head parts 74, in the U limbs 12. The drive 40 is thereby buttoned to the mounting bracket 10. Since the mounting bracket 10 is subsequently inserted into and fastened to the withdrawable frame 24 (FIG. 2) there is no risk that the drive 40 could become detached from the mounting bracket 10 through the U limbs 12 springing open.

Although modifications and changes may be suggested by those of ordinary skill in the art, it is the intention of the inventors to embody within the patent warranted hereon all changes and modifications as reasonably and properly come within the scope of their contribution to the art.

We claim as our invention:

1. A holding system for electronic modules, particularly for magnetic disk drives, said holding system comprising:

a withdrawable frame having a length corresponding to a depth of a drive bay of an electronic data processing device, wherein said withdrawable frame can be inserted in an inserting direction into said drive bay; and a U-shaped bracket having U limbs aligned parallel to said inserting direction, said U limbs having first holes and second holes formed therethrough, wherein first fastening elements pass through said first holes and fasten said U-shaped bracket to lateral surfaces, directed parallel to said inserting direction, of said electronic modules arranged between said U limbs, and wherein second fastening elements pass through said second holes and fasten said U-shaped bracket to said withdrawable frame, wherein said electronic modules are mounted and adapted to said withdrawable frame.

2. The holding system as claimed in claim 1, wherein said first holes are arranged asymmetrically with respect to a longitudinal bisector of said U limbs.

3. The holding system as claimed in claim 1, wherein said U-shaped bracket further comprises a U crossweb having fastening holes therethrough, wherein a plug fastens to said fastening holes, said plug electrically connects said electronic module to a rear wall of said device.

4. The holding system as claimed in claim 1, wherein said first holes have smooth bores, and said second holes have an internal thread.

5. The holding system as claimed in claim 4, wherein said withdrawable frame further comprises elongated holes formed therethrough, said elongated holes being assigned to said second holes and having longitudinal axes running parallel to said inserting direction.

6. The holding system as claimed in claim 1, wherein said first holes are formed as elongated holes having longitudinal axes running parallel to said inserting direction.

7. The holding system as claimed in claim 1, wherein said withdrawable frame is a cuboid housing having a first housing wall, directed parallel to said inserting direction, and second and third housing walls adjacent said first housing wall, wherein said first housing wall projects beyond said adjacent second and third housing walls at its edges parallel to said inserting direction such that said withdrawable frame can be inserted with said edges into guide rails of said drive bay.

8. The holding system as claimed in claim 1, wherein said first and the second fastening elements are surrounded by damping elements consisting of an elastic material, at least in their region penetrating said U limbs and withdrawable frame.

9. The holding system as claimed in claim 8, wherein said damping elements further comprise at least one flange, wherein said at least one flange bears against a U limb surface, and a holding section, wherein said holding section engages said first and second holes.

10. The holding system as claimed in claim 9, wherein said damping elements further comprise two mutually parallel flanges interconnected by said holding element.

11. The holding system as claimed in claim 8, wherein said first holes are of rectangular construction.

12. The holding system as claimed in claim 8, wherein said damping elements are permanently connected to said fastening elements.

* * * * *